(12) United States Patent
Gong et al.

(10) Patent No.: US 9,783,038 B2
(45) Date of Patent: Oct. 10, 2017

(54) VEHICLE BATTERY CLAMPING DEVICE

(71) Applicant: SHENZHEN ZHILUN DRIVING TECHNOLOGY FOR ELECTRIC VEHICLE CO., LTD., Guangdong (CN)

(72) Inventors: Shugang Gong, Guangdong (CN); Lei Zeng, Guangdong (CN); Huilong Yang, Guangdong (CN); Shaorong Lin, Guangdong (CN); Liguang Peng, Guangdong (CN)

(73) Assignee: SHENZHEN ZHILUN DRIVING TECHNOLOGY FOR ELECTRIC VEHICLE CO., LTD., Shenzhen (CN)

( * ) Notice: Subject to any disclaimer, the term of this patent is extended or adjusted under 35 U.S.C. 154(b) by 0 days.

(21) Appl. No.: 15/300,473

(22) PCT Filed: Apr. 1, 2014

(86) PCT No.: PCT/CN2014/074558
§ 371 (c)(1),
(2) Date: Sep. 29, 2016

(87) PCT Pub. No.: WO2015/149286
PCT Pub. Date: Oct. 8, 2015

(65) Prior Publication Data
US 2017/0106736 A1 Apr. 20, 2017

(51) Int. Cl.
*B60K 1/04* (2006.01)
*H01M 2/10* (2006.01)
(52) U.S. Cl.
CPC ............. *B60K 1/04* (2013.01); *H01M 2/1083* (2013.01); *H01M 2220/20* (2013.01)

(58) Field of Classification Search
CPC ................... B60K 1/00–1/08; H01M 2/1083
See application file for complete search history.

(56) References Cited

U.S. PATENT DOCUMENTS 7,712,563 B2 * 5/2010 Niebuhr ................... B60K 1/04
180/311

FOREIGN PATENT DOCUMENTS

| CN | 101559705 A | 10/2009 |
| CN | 201703237 U | 1/2011 |

(Continued)

OTHER PUBLICATIONS

International Search Report of PCT/CN2014/074558 dated Dec. 24, 2014.

(Continued)

*Primary Examiner* — John Walters
*Assistant Examiner* — James Triggs
(74) *Attorney, Agent, or Firm* — Maier & Maier, PLLC

(57) ABSTRACT

Disclosed is a vehicle battery clamping device comprising: a fixed beam (72) provided on a frame of a vehicle; a handle rotary shaft (73) provided on the fixed beam (72), a winding wheel train (731) provided on the handle rotary shaft (73); a steel wire rope (732) wound around the winding wheel train; a front rotary shaft (741) rotationally connected to the fixed beam (72); a rear rotary shaft (743) rotationally connected to the frame; a synchronous belt (75), with both ends being respectively wound around the front rotary shaft (741) and the rear rotary shaft (743); and a guide wheel assembly (76) provided on the fixed beam (72), wherein the steel wire rope (732) passes through the guide wheel assembly (76) and has its two ends respectively connected to the synchronous belt (75); and the two batteries are respectively clamped on each side of the vehicle battery clamping device.

10 Claims, 6 Drawing Sheets

(56) References Cited

FOREIGN PATENT DOCUMENTS

| | | |
|---|---|---|
| CN | 202163417 U | 3/2012 |
| CN | 202413387 U | 9/2012 |
| CN | 202703226 U | 1/2013 |
| EP | 0574281 B1 | 10/1995 |
| TW | I364370 B1 | 5/2012 |

OTHER PUBLICATIONS

Espacenet bibliographic data for CN Publication No. 202163417 published Mar. 14, 2012, 1 page.
Espacenet bibliographic data for CN Publication No. 202703226 published Jan. 30, 2013, 2 pages.
Espacenet bibliographic data for TW Publication No. 1364370 published May 21, 2012, 1 page.
Espacenet bibliographic data for CN Publication No. 202413387 published Sep. 5, 2012, 1 page.
Espacenet bibliographic data for CN Publication No. 201703237 published Jan. 12, 2011, 1 page.
Espacenet bibliographic data for CN Publication No. 101559705 published Oct. 21, 2009, 1 page.
Espacenet bibliographic data for EP Publication No. 0574281 published Oct. 25, 1995, 1 page.

* cited by examiner

VEHICLE BATTERY CLAMPING DEVICE

TECHNICAL FIELD

The invention belongs to the field of clamping technology; particularly, the invention claims a vehicle battery clamping device.

BACKGROUND

Each vehicle is equipped with batteries, which are large and heavy. This is especially true for an electric vehicle's batteries. Because an electric vehicle depends on the batteries to provide all the required power, an electric vehicle has more and heavier batteries. The clamping structure/mounting structure for these batteries must meet the requirement for ease of mounting and removal; otherwise, it will be very inconvenient to replace the batteries.

The following methods are generally used for mounting/clamping batteries of electric vehicles at present: 1. modularizing all the batteries and mounting them on vehicles; 2. fastening the batteries onto vehicles with fasteners. Modular battery packs referred to in method 1 are large and especially heavy, with much space occupied, making it very inconvenient for mounting and removing them. The mounting manner referred to in method 2 requires tools to mount and remove batteries, making the operation very inconvenient and difficult.

Technical Problem

The invention is intended to overcome defects of the prior art and provide a vehicle battery clamping device that enables flexible mounting and removal of batteries.

Technical Solution

The invention is embodied as a vehicle battery clamping device mounted on a frame of a vehicle for clamping two identical batteries in the vehicle, comprising:

a fixed beam fixedly arranged on the frame;

a handle rotary provided on the fixed beam, with a winding wheel train fixedly arranged on the handle rotary shaft;

a steel wire rope wound around the winding wheel train;

a front rotary shaft, with an upper end thereof rotationally connected to the fixed beam, and a lower end thereof provided with a front clamping plate, the front clamping plate being perpendicular to the front rotary shaft;

a rear rotary shaft, with an upper end thereof rotationally connected to the frame, and a lower end thereof provided with a rear clamping plate, the rear clamping plate being perpendicular to the rear rotary shaft;

a synchronous belt, with both ends thereof respectively wound around the front rotary shaft and the rear rotary shaft, configured to synchronously drive the front rotary shaft and the rear rotary shaft to rotate;

a guide wheel assembly configured for changing the driving direction of the steel wire rope and arranged on the fixed beam, wherein the steel wire rope passes through the guide wheel assembly and has its two ends respectively connected to the synchronous belt;

wherein, the fixed beam, the front rotary shaft and the front clamping plate form an I-shaped clamping structure; the rear clamping plate and the rear rotary shaft form an inverted T-shaped clamping structure. The front and rear ends of the two batteries are respectively clamped on each side of the I-shaped clamping structure and each side of the inverted T-shaped clamping structure.

Furthermore, each end of the handle rotary shaft is provided with a foldable handle, which is perpendicular to the handle rotary shaft.

Furthermore, the fixed beam is provided with a bracket for supporting the handle rotary shaft, which rotates on the bracket.

Specifically, the guide wheel assembly comprises a framework and several guide wheels for changing the driving direction of the steel wire rope, wherein the framework is provided on the fixed beam, the guide wheels are provided in the framework, and the steel wire rope passing the guide wheel assembly are wound around the guide wheels.

More specifically, the front rotary shaft is provided with a front gear, the rear rotary shaft is provided with a rear gear, and the synchronous belt is a flexible rack wound around the front gear and the rear gear in the form of a closed loop.

Further, the synchronous belt is clamped by two synchronous belt locks respectively on both sides of the synchronous belt and both ends of the steel wire rope are connected respectively to the synchronous belt locks.

Furthermore, each end of the fixed beam is provided with an elastic front clamping piece, which clamps the outside of the batteries; the frame is provided with two elastic rear clamping pieces, which clamp the outside of the batteries.

Specifically, the ends of the two front clamping pieces are provided with front clamping recesses to accommodate the front clawing plate and the frame is provided with a front clamping recess lock to fasten the front clamping plate in the front clamping recesses; the ends of two rear clamping pieces are provided with rear clamping recesses to accommodate the rear clamping plate and the frame is provided with a rear clamping recess lock to fasten the rear clamping plate in the rear clamping recesses.

More specifically, the front clamping recess lock comprises a front lock sleeve, a front pressing piece and a front locking piece that can retract into the front lock sleeve after the front pressing piece is jacked; the front pressing piece and the front locking piece are provided in the front lock sleeve. The rear clamping recess lock comprises a rear lock sleeve, a rear pressing piece and a rear locking piece that can retract into the rear lock sleeve after the rear pressing piece is jacked; the rear pressing piece and the rear locking piece are provided in the rear lock sleeve.

Particularly, each end of the front clamping plate is provided with a front U-shaped opening to accommodate the front clamping recess and each end of the rear clamping plate is provided with a rear U-shaped opening to accommodate the rear clamping recess.

Advantageous Effects of the Present Invention

The vehicle battery clamping device mentioned in the invention has the following technical effects:

The invention utilizes the driving function of the steel wire rope and the guiding function of the guide wheel assembly to skillfully and indirectly drive the front and rear clamping plates to rotate so as to achieve the effect of clamping and releasing the batteries. The invention is structurally simple and light, and saves cost and mounting space. The invention is also very convenient to operate and allows quick and convenient mounting and dismounting of batteries without using other tools.

DETAILED DESCRIPTION OF THE PREFERRED EMBODIMENT

The present invention will now be described in detail with reference to the accompanying drawings representing preferred embodiments to more clearly clarify the purpose, technical solution and advantages of the invention. It should be understood that the preferred embodiments described herein are only to explain the invention and are not intended to limit the invention.

Figure 1:
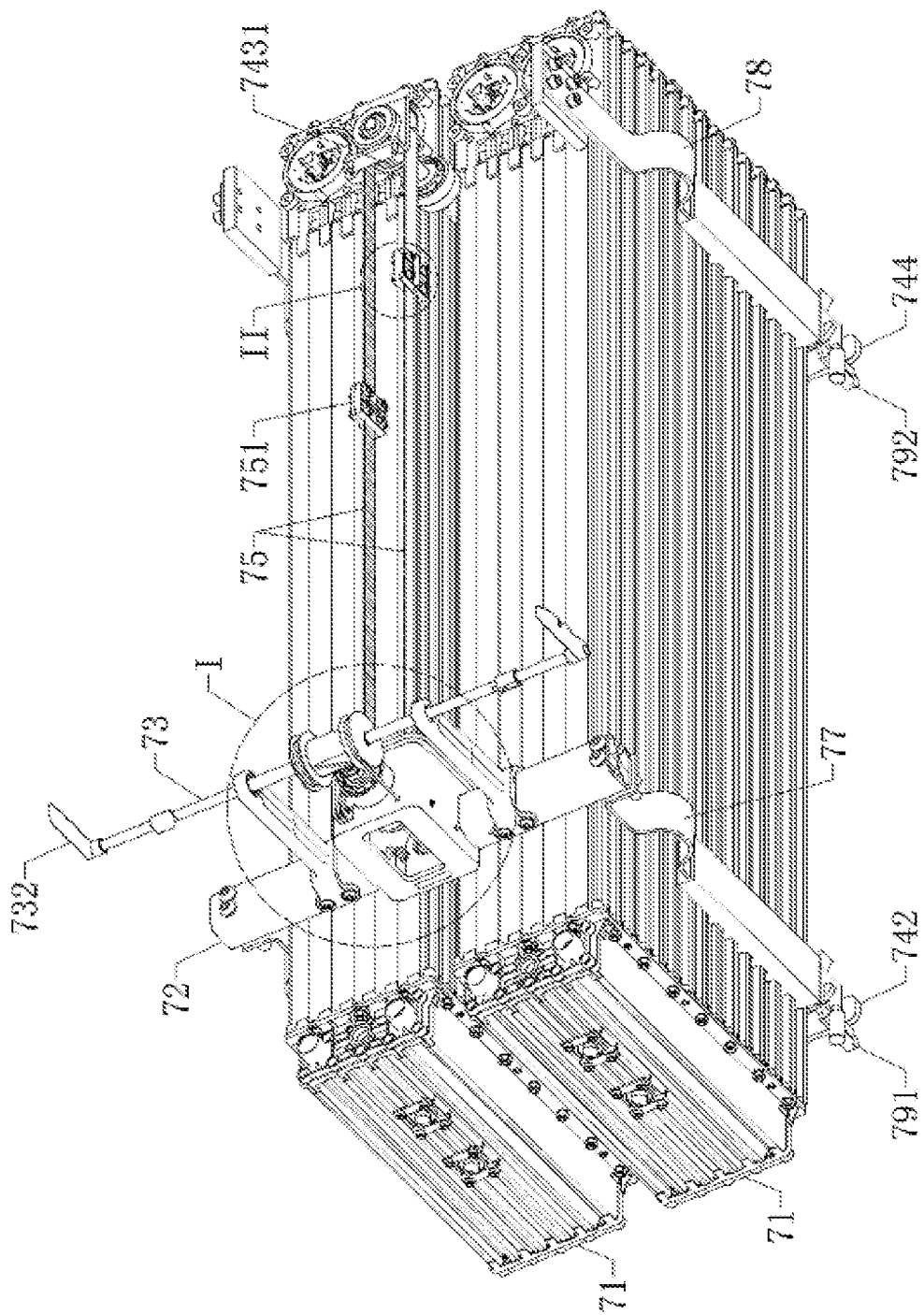
FIG. 1 depicts a top perspective view of a vehicle battery clamping device according to an embodiment of the invention.
Figure 2:
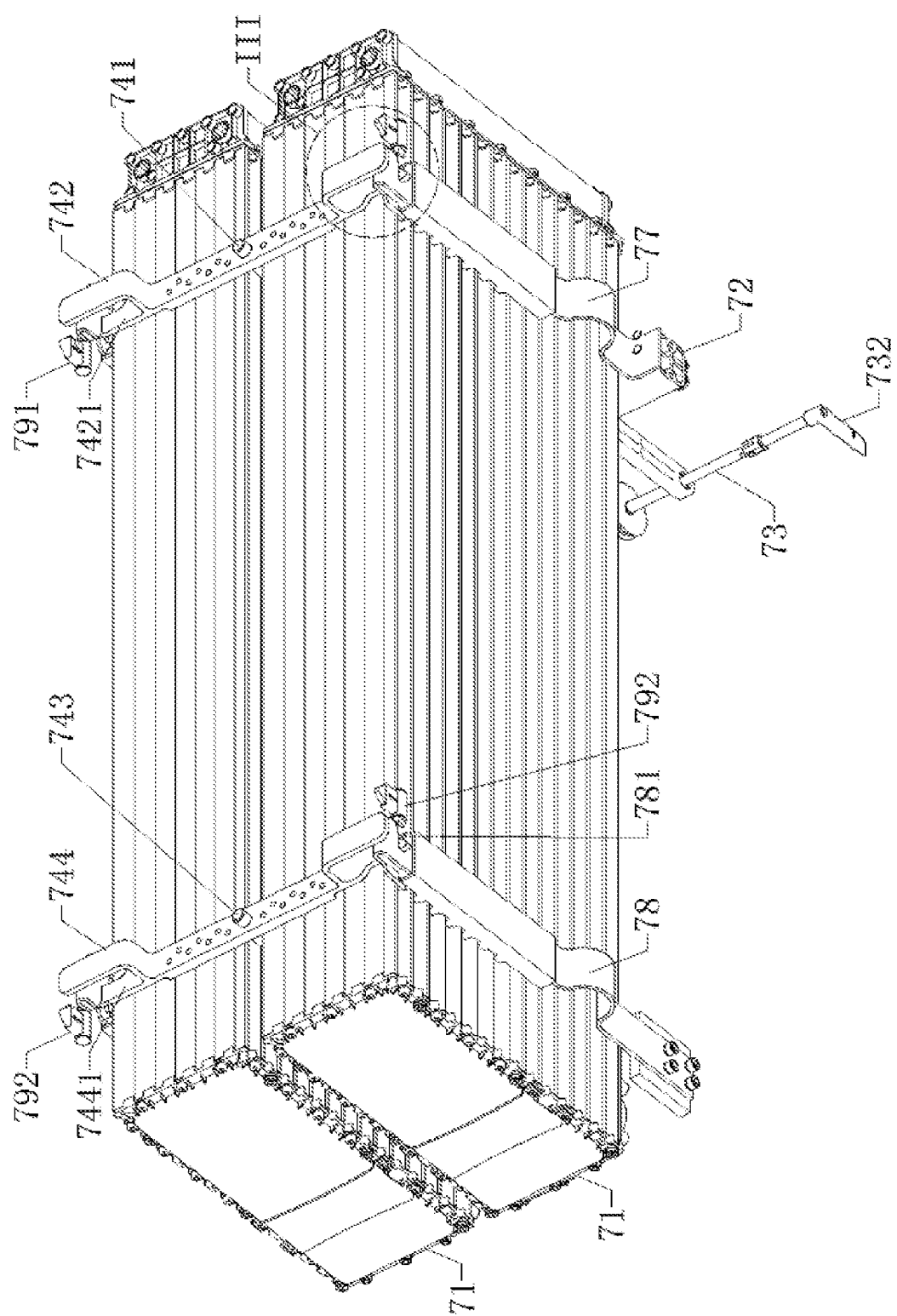
FIG. 2 depicts a bottom perspective view of a vehicle battery clamping device according to an embodiment of the invention.
Figure 3:
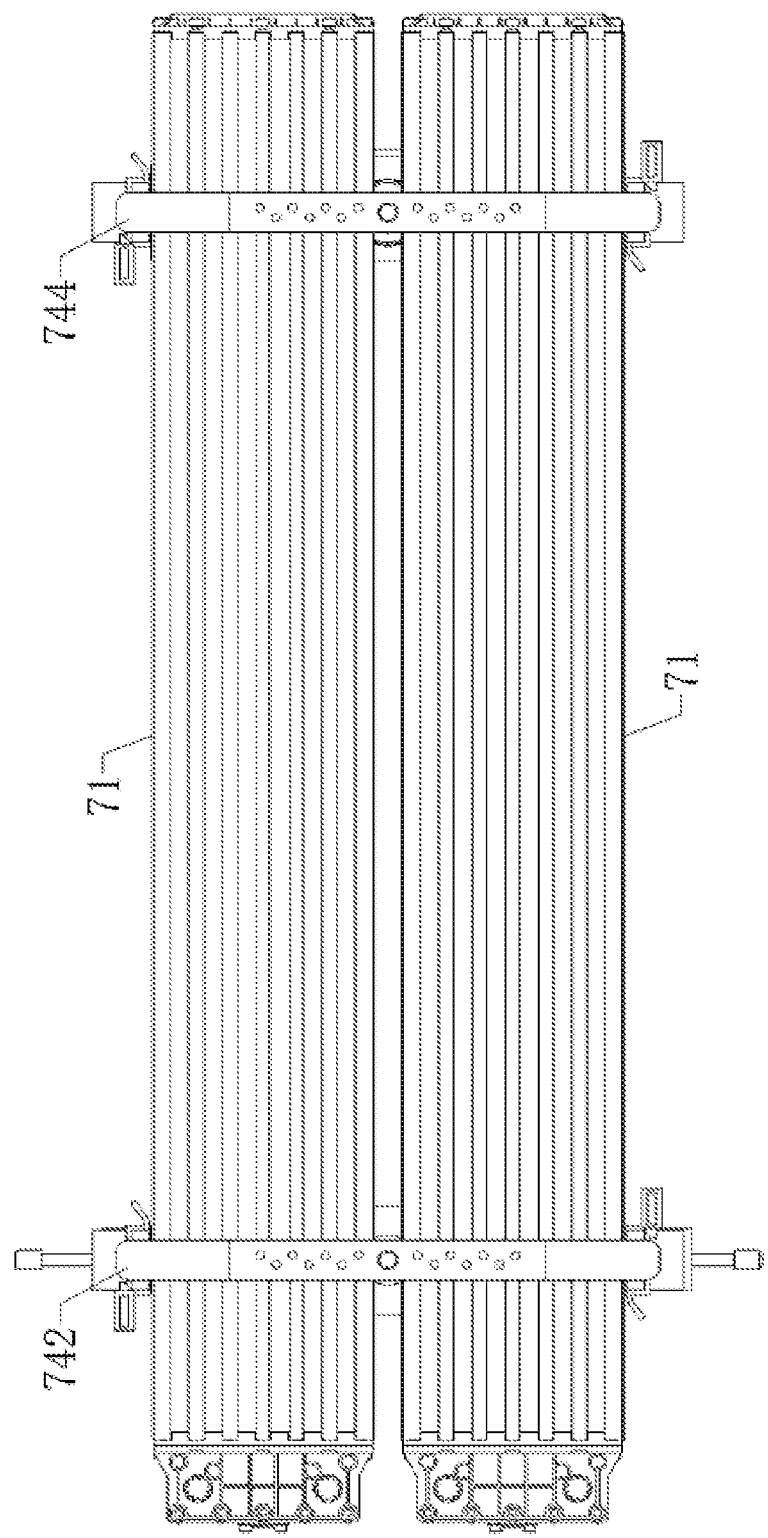
FIG. 3 depicts a bottom view of a vehicle battery clamping device according to an embodiment of the invention.
Figure 5:
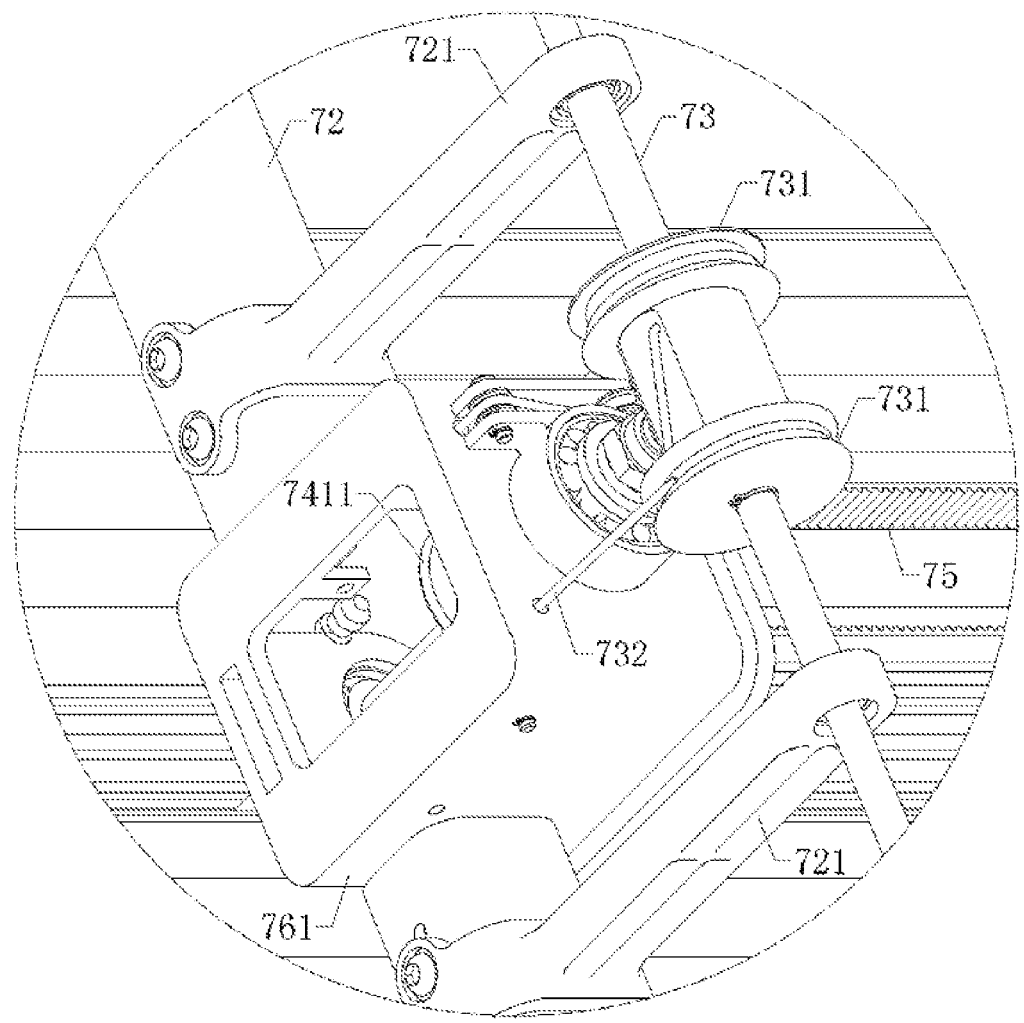
FIG. 5 depicts a local enlarged view of the part I in FIG. 1.

With reference to FIG. 1 to FIG. 3, the preferred embodiments of the invention introduce a vehicle battery clamping device mounted on a frame of a vehicle (a frame is not shown in the drawings) to clamp two identical batteries 71 in the vehicle, comprising:

A fixed beam 72 provided to the frame;

A handle rotary 73 provided on the fixed beam 72, with a winding wheel train 731 provided on the handle rotary shaft 73 (detailed in FIG. 5);

A steel wire rope 732 wound around the winding wheel train 731;

A front rotary shaft 741, with the upper end rotationally connected to the fixed beam 72, and the lower end provided with a front clamping plate 742, which is perpendicular to the front rotary shaft 741;

A rear rotary shaft 743, with the upper end rotationally connected to the frame, and the lower end provided with a rear clamping plate 744, which is perpendicular to the rear rotary shaft 743;

A synchronous belt 75, with both ends respectively wound around the front rotary shaft 741 and the rear rotary shaft 743 to synchronously drive the front rotary shaft 741 and the rear rotary shaft 743 to rotate;

A guide wheel assembly 76, for changing the driving direction of the steel wire rope 732, provided on the fixed beam 72, wherein the steel wire rope 732 passes through the guide wheel assembly 76 and has its two ends respectively connected to the synchronous belt 75;

The fixed beam 72, the front rotary shaft 741 and the front clamping plate 742 form an I-shaped clamping structure; the rear clamping plate 744 and the rear rotary shaft 743 form an inverted T-shaped clamping structure. The front and rear ends of the two batteries 71 are respectively clamped on each side of the I-shaped clamping structure and each side of the inverted T-shaped clamping structure.

Assume that the drawings depict the initial state the embodiment of the invention. When the handle rotary shaft 73 is turned, the winding wheel train 731 drives the steel wire rope 732 to rotate. Through guidance/direction change of the guide wheel assembly 76, the steel wire rope 732 drives the synchronous belt 75 to rotate. The synchronous belt 75 further drives the front rotary shaft 741 and rear rotary shaft 743 to rotate at the same time and the front clamping plate 742 and rear clamping plate 744 rotate with them. After the front clamping plate 742 and rear clamping plate 744 rotate by 90°, they become flush with the gap between the two batteries 71 and at this moment, the batteries 71 can be removed. To remount the batteries 71, place the batteries 71 into the clamping position and then turn the handle rotary shaft 73 to make the front clamping plate 742 and rear clamping plate 744 rotate to form an angle of 90° with the batteries 71 to complete the clamping of the batteries 71.

The invention utilizes the driving function of the steel wire rope and the guiding function of the guide wheel assembly to skillfully and indirectly drive the front and rear clamping plates to rotate so as to achieve the effect of clamping and releasing the batteries. The invention is structurally simple and light, and saves cost and mounting space. The invention is also very convenient to operate and allows quick and convenient mounting and dismounting of batteries without using other tools.

Figure 4:
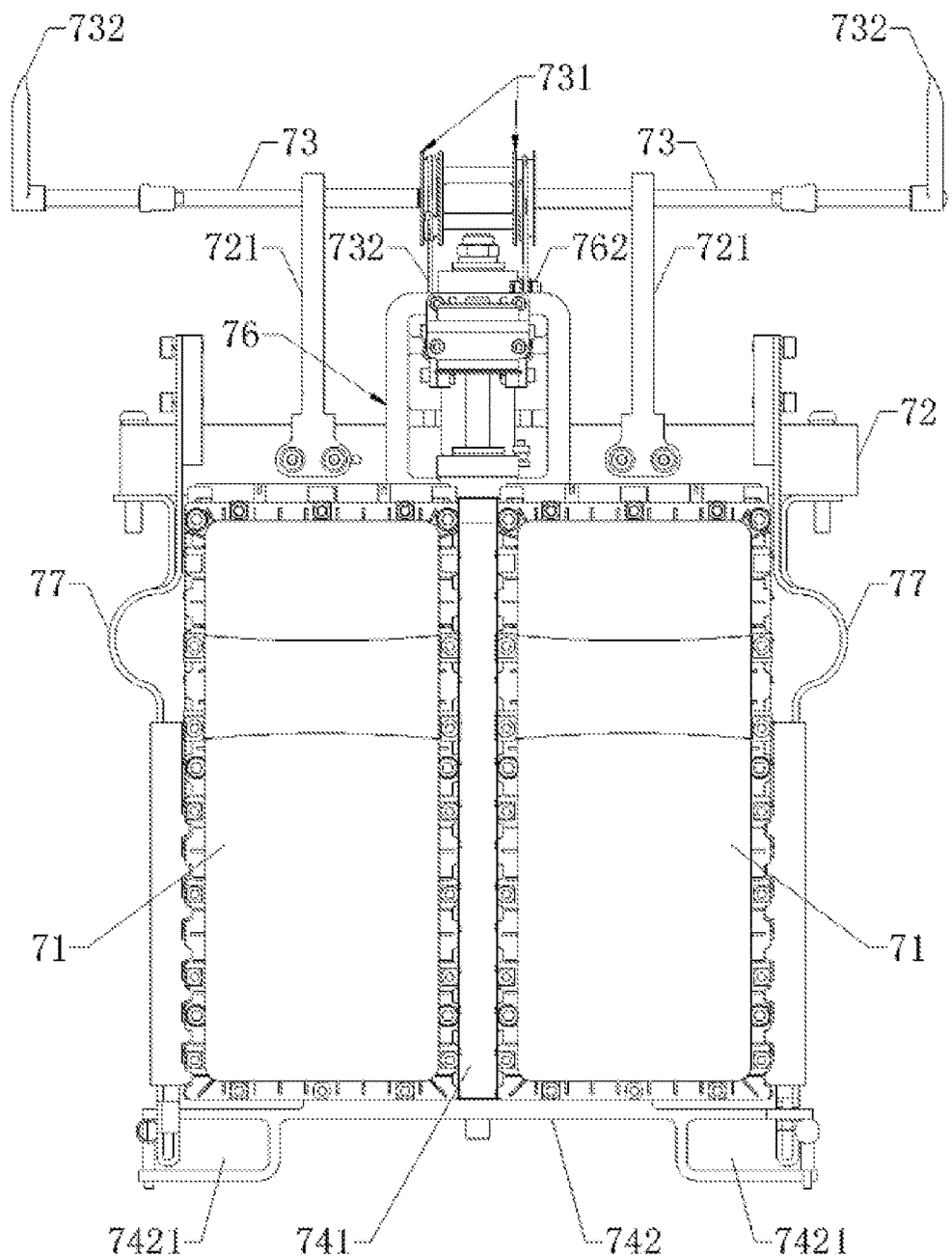
FIG. 4 depicts a main view of the front end surface of a vehicle battery clamping device according to an embodiment of the invention.

With reference to FIG. 4, to facilitate the turning operation of the handle rotary shaft 73, each end of the handle rotary shaft 73 is provided with a foldable handle 732, which is perpendicular to the handle rotary shaft 73. When the invention is not operated, handle 732 is folded. When the invention is operated, the handle 732 is unfolded and rotates around the axis of the handle rotary shaft 73.

With reference to FIG. 5, the fixed beam 72 is provided with a bracket 721 for supporting the handle rotary shaft 73, which rotates on the bracket 721.

With reference to FIG. 5, the guide wheel assembly 76 comprises a framework 761 and several guide wheels 762 for changing the driving direction of the steel wire rope 732, wherein the framework 761 is provided on the fixed beam 72, the guide wheels 762 are provided in the framework 761, and the steel wire rope 732 passing the guide wheel assembly 76 are wound around the guide wheels 762. Specifically, the structure shown in FIG. 5 is an embodiment of the invention. The guide wheels 762 in the framework 761 may be placed in a manner based on the actual structural requirements as long as they can achieve the effect of changing the driving direction of the steel wire rope 732. For example, only two pulleys may be used to change the driving direction of the steel wire rope 732.

Specifically, the front rotary shaft 741 is provided with a front gear 7411, the rear rotary shaft 743 is provided with a rear gear 7431, and the synchronous belt 75 is a flexible rack wound around the front gear 7411 and the rear gear 7431 in the form of a closed loop. Using a flexible rack as the synchronous belt can achieve the effect of flexible reciprocating motion. The flexible rack drives the front rotary shaft 741 and the rear rotary shaft 743 to rotate.

Figure 6:
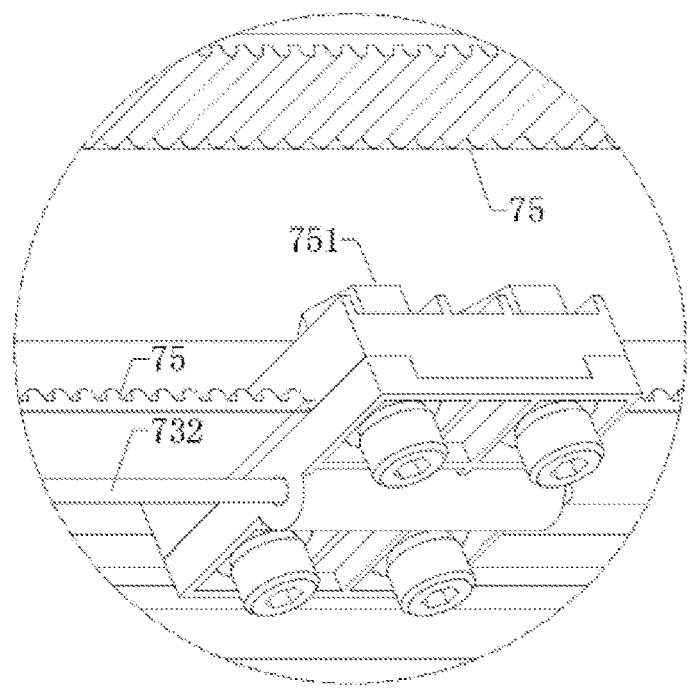
FIG. 6 depicts a local enlarged view of the part II in FIG. 1.

With reference to FIG. 6, the synchronous belt 75 is clamped by two synchronous belt locks 751 respectively on both sides of the synchronous belt 75 and both ends of the steel wire rope 732 are connected respectively to the synchronous belt locks 751. During operation, the synchronous belt locks 751 clamp the synchronous belt 75 and are connected to the steel wire rope 732.

With reference to FIG. 1 to FIG. 3, each end of the fixed beam 72 is provided with an elastic front clamping piece 77, which clamps the outside of the batteries 71; the frame is provided with two elastic rear clamping pieces 78, which clamp the outside of the batteries 71. The front clamping pieces 77 and rear clamping pieces 78 function to position and absorb the shock of the batteries 71. The front clamping pieces 77 and rear clamping pieces 78 are elastic and enable the batteries 71 to be mounted conveniently. The front clamping pieces 77 and rear clamping pieces 78 can also be provided (covered) with shock absorbing polyurethane material for shock absorption and skid resistance.

Figure 7:
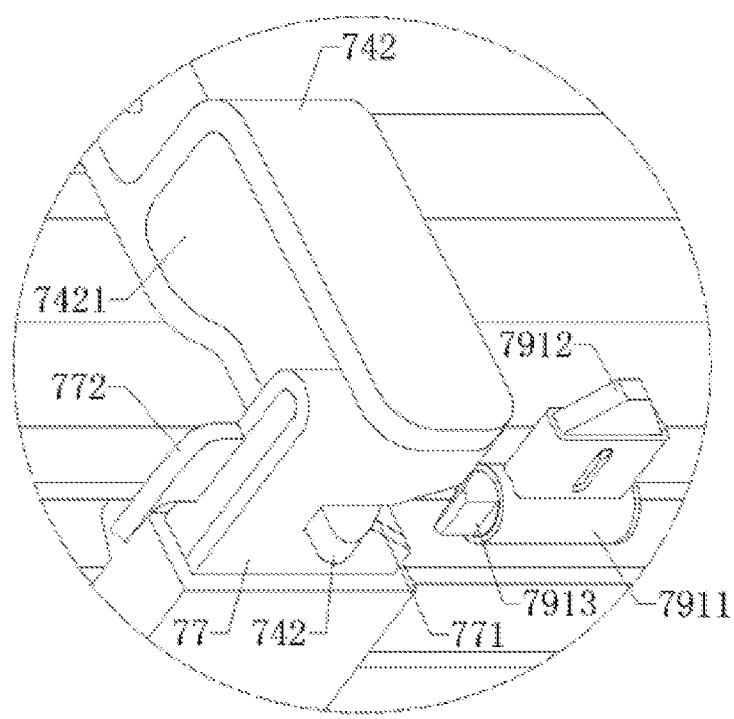
FIG. 7 depicts a local enlarged view of the part III in FIG. 2.

With reference to FIG. 7, the ends of the two front clamping pieces 77 are provided with front clamping recesses 771 to accommodate the front clamping plate 742 and the frame is provided with a front clamping recess lock 791 to fasten the front clamping plate 742 in the front clamping recesses 771. With reference to FIG. 2, the ends of two rear clamping pieces 78 are provided with rear clamping recesses 781 to accommodate the rear clawing plate 744 and the frame is provided with a rear clamping recess lock 792 to fasten the rear clamping plate 744 in the rear clamping recesses 781. As such, gaps between the front clamping plate 742 and the front clamping pieces 77, and between the rear clamping plate 744 and the rear clamping pieces 78 can be securely closed to prevent the batteries 71 from falling off.

With reference to FIG. 7, the front clamping recess lock 791 comprises a front lock sleeve 7911, a front pressing piece 7912 and a front locking piece 7913 that can retracts into the front lock sleeve 7911 after the front pressing piece 7912 is jacked; the front pressing piece 7912 and the front locking piece 7913 are provided in the front lock sleeve 7911. With reference to FIG. 2, the rear clamping recess lock 792 comprises a rear lock sleeve, a rear pressing piece and a rear locking piece that can retracts into the rear lock sleeve after the rear pressing piece is jacked; the rear pressing piece and the rear locking piece are provided in the rear lock sleeve, in the preferred embodiments of the invention, the rear clamping recess lock 792 and the front clamping recess lock 791 have the same structure, as shown in FIG. 7. When the front clamping plate 742 rotates, it jacks the front pressing piece 7912 and the front locking piece 7913 retracts into the front lock sleeve 7911 to release the front clamping plate 742 from the front clamping pieces 77 so as to eject the batteries 71.

Specifically, each end of the front clamping plate 742 is provided with a front U-shaped opening 7421 to accommodate the front clamping recess 771 and each end of the rear clamping plate 744 is provided with a rear U-shaped opening 7441 to accommodate the rear clamping recess 781. U-shaped openings provided at both ends of each clamping plate can better enable the closure and separation between the front clamping plate 742 and the front clamping pieces 77 and between the rear clamping plate 744 and the rear clamping pieces 78. Moreover, to enable both ends of each clamping plate to fit into the clamping recesses more easily, a beveled piece is set behind each clamping recess. As shown in FIG. 7, the front beveled piece 772 is set behind the front clamping recess 771. When a clamping plate impacts a beveled piece from behind the clamping recess, the clamping plate unfolds to enable both ends of the clamping plate to fit into two corresponding clamping recesses.

Particularly, the front clamping plate 742, front clamping pieces 77, rear clamping plate 744 and rear clamping pieces 78 in the preferred embodiments of the invention have the same structural form.

In light of the specific structure of the vehicle battery clamping device demonstrated in the embodiments mentioned above, its operation procedure is described summarily as follows:

Place an extendable supporting tool (e.g., a horizontal jack) under the batteries 71 to support them;

Turn the handle rotary shaft 73 to enable the steel wire rope 732 to drive the synchronous belt 75, which further drives the front rotary shaft 741 and the rear rotary shaft 743 to rotate until the front clamping plate 742 and the rear clamping plate 744 become flush with the gap between the two batteries 71. At the moment, the batteries 71 would fall off;

The batteries 71 would fall on the extendable supporting tool. Retract the supporting tool to separate the batteries 71 from the vehicle battery clamping device. In this way, the batteries are removed;

Mounting of the batteries 71 onto the vehicle battery clamping device is in the reverse order of the removal procedure mentioned above.

It is important to note that in emergency, the batteries may be removed without an extendable supporting tool and the batteries would fall directly onto floor.

Although the present invention has been illustrated and described herein with reference to preferred embodiments, it should not be construed as limiting the scope of the invention. Any modifications, equivalent substitutions or improvements that are within the spirit and principle of the invention are intended to be covered by the protection scope of the invention.

The invention claimed is:

1. A vehicle battery clamping device mounted on a frame of a vehicle for clamping two identical batteries in the vehicle, wherein the device comprises:
   a fixed beam fixedly arranged on the frame;
   a handle rotary provided on the fixed beam, with a winding wheel train fixedly arranged on the handle rotary shaft;
   a steel wire rope wound around the winding wheel train;
   a front rotary shaft, with an upper end thereof rotationally connected to the fixed beam, and a lower end thereof provided with a front clamping plate, the front clamping plate being perpendicular to the front rotary shaft;
   a rear rotary shaft, with an upper end thereof rotationally connected to the frame, and a lower end thereof provided with a rear clamping plate, the rear clamping plate being perpendicular to the rear rotary shaft;
   a synchronous belt, with both ends thereof respectively wound around the front rotary shaft and the rear rotary shaft, configured to synchronously drive the front rotary shaft and the rear rotary shaft to rotate;
   a guide wheel assembly configured for changing the driving direction of the steel wire rope and arranged on the fixed beam, wherein the steel wire rope passes through the guide wheel assembly and has its two ends respectively connected to the synchronous belt;
   wherein, the fixed beam, the front rotary shaft and the front clamping plate form an I-shaped clamping structure; the rear clamping plate and the rear rotary shaft form an inverted T-shaped clamping structure, the front and rear ends of the two batteries are respectively clamped on each side of the I-shaped clamping structure and each side of the inverted T-shaped clamping structure.

2. The vehicle battery clamping device according to claim 1, wherein each end of the handle rotary shaft is provided with a foldable handle, which is perpendicular to the handle rotary shaft.

3. The vehicle battery clamping device according to claim 2, wherein the fixed beam is provided with a bracket for supporting the handle rotary shaft, which rotates on the bracket.

4. The vehicle battery clamping device according to claim 1, wherein the guide wheel assembly comprises a framework and several guide wheels for changing the driving direction of the steel wire rope; the framework is provided on the fixed beam, the guide wheels are provided in the framework, and the steel wire rope passing the guide wheel assembly are wound around the guide wheels.

5. The vehicle battery clamping device according to claim 1, wherein the front rotary shaft is provided with a front gear, the rear rotary shaft is provided with a rear gear, and the synchronous belt is a flexible rack wound around the front gear and the rear gear in the form of a closed loop.

6. The vehicle battery clamping device according to claim 5, wherein the synchronous belt is clamped by two synchronous belt locks respectively on both sides of the synchronous belt and both ends of the steel wire rope are connected respectively to the synchronous belt locks.

7. The vehicle battery clamping device according to claim 1, wherein each end of the fixed beam is provided with an elastic front clamping piece, which clamps the outside of the batteries; the frame is provided with two elastic rear clamping pieces, which clamp the outside of the batteries.

8. The vehicle battery clamping device according to claim 7, wherein the ends of the two front clamping pieces are provided with front clamping recesses to accommodate the front clamping plate and the frame is provided with a front clamping recess lock to fasten the front clamping plate in the front clamping recesses; the ends of two rear clamping pieces are provided with rear clamping recesses to accommodate the rear clamping plate and the frame is provided with a rear clamping recess lock to fasten the rear clamping plate in the rear clamping recesses.

9. The vehicle battery clamping device according to claim 8, wherein the front clamping recess lock comprises a front lock sleeve, a front pressing piece and a front locking piece that retracts into the front lock sleeve after the front pressing piece is jacked; the front pressing piece and the front locking piece are provided in the front lock sleeve; the rear clamping recess lock comprises a rear lock sleeve, a rear pressing piece and a rear locking piece that retracts into the rear lock sleeve after the rear pressing piece is jacked; the rear pressing piece and the rear locking piece are provided in the rear lock sleeve.

10. The vehicle battery clamping device according to claim 9, wherein each end of the front clamping plate is provided with a front U-shaped opening to accommodate the front clamping recess and each end of the rear clamping plate is provided with a rear U-shaped opening to accommodate the rear clamping recess.

* * * * *